(12) United States Patent
Daffos

(10) Patent No.: US 9,862,484 B2
(45) Date of Patent: Jan. 9, 2018

(54) AIRCRAFT UNDERCARRIAGE WITH WHEEL BRAKE AND DRIVE ASSEMBLY HAVING A COUPLER MEMBER

(71) Applicant: MESSIER-BUGATTI-DOWTY, Velizy Villacoublay (FR)

(72) Inventor: Mathieu Daffos, Velizy-Villacoublay (FR)

(73) Assignee: MESSIER-BUGATTI-DOWTY, Velizy-Villacoublay (FR)

( * ) Notice: Subject to any disclaimer, the term of this patent is extended or adjusted under 35 U.S.C. 154(b) by 167 days.

(21) Appl. No.: 14/868,803

(22) Filed: Sep. 29, 2015

(65) Prior Publication Data

US 2016/0096619 A1 Apr. 7, 2016

(30) Foreign Application Priority Data

Oct. 3, 2014 (FR) ..................... 14 59503

(51) Int. Cl.
*B64C 25/40* (2006.01)
*B64C 25/42* (2006.01)
*B64C 25/34* (2006.01)

(52) U.S. Cl.
CPC ............ *B64C 25/405* (2013.01); *B64C 25/34* (2013.01); *B64C 25/42* (2013.01); *Y02T 50/823* (2013.01)

(58) Field of Classification Search
CPC ....... B64C 25/405; B64C 25/32; B64C 25/42; B64C 25/44; B64C 25/34; F16D 13/38; F16D 13/52; F16D 25/062–25/0638; F16D 25/08; F16D 25/082; F16D 27/10; F16D 27/108–27/115

USPC ............................................. 301/6.1–6.2, 6.5
See application file for complete search history.

(56) References Cited

U.S. PATENT DOCUMENTS 3,977,631 A * 8/1976 Jenny ..................... B64C 25/405
188/71.5
5,248,013 A * 9/1993 Hogue .................... F16D 55/36
188/264 G
5,485,898 A * 1/1996 Patko ...................... F16D 55/36
188/18 A (Continued)

FOREIGN PATENT DOCUMENTS

EP 2460723 A1 6/2012
WO 2011/030365 A2 3/2011

(Continued)

OTHER PUBLICATIONS

English machine translation of WO 2012098198, as disclosed by Applicant.*

(Continued)

*Primary Examiner* — Tien Q Dinh
*Assistant Examiner* — Alexander V. Giczy
(74) *Attorney, Agent, or Firm* — Sughrue Mion, PLLC

(57) ABSTRACT

An undercarriage having a wheel mounted on an axle (3), a brake and a drive assembly. The brake comprises a torsion tube (9), friction members (11) mounted around the torsion tube, and at least one brake actuator (13) for selectively exerting a braking force on the friction members. The drive assembly is operative to drive rotation of the wheel and comprises an electric motor (14) that is connected to a rim (5) of the wheel (4) by a coupler member (15). The coupler member extends at least in part around the axle (3) between the axle and the torsion tube (9) of the brake.

9 Claims, 2 Drawing Sheets

(56) References Cited

U.S. PATENT DOCUMENTS

| | | | | |
|---|---|---|---|---|
| 7,445,178 B2* | 11/2008 | McCoskey | B64F 1/32 | 244/100 R |
| 8,136,755 B2* | 3/2012 | Hadley | B64C 25/50 | 244/103 R |
| 9,527,583 B2* | 12/2016 | Bedarrides | B64C 25/405 | |
| 9,670,975 B1* | 6/2017 | Rook | F16D 65/0006 | |
| 2005/0056499 A1* | 3/2005 | Narcy | F16D 55/36 | 188/71.6 |
| 2005/0206250 A1* | 9/2005 | Steffen | B60K 7/0007 | 310/59 |
| 2011/0156472 A1* | 6/2011 | Bucheton | B64C 25/405 | 301/6.2 |
| 2011/0284685 A1* | 11/2011 | Gilleran | B64C 25/405 | 244/50 |
| 2011/0304292 A1* | 12/2011 | Charuel | B64C 25/405 | 318/450 |
| 2012/0138735 A1* | 6/2012 | Nierlich | B64C 25/405 | 244/50 |
| 2013/0062466 A1* | 3/2013 | Sweet | B64C 25/405 | 244/103 R |
| 2013/0091969 A1* | 4/2013 | Bucheton | B64C 25/405 | 74/405 |
| 2013/0167678 A1* | 7/2013 | Eluard | B64C 25/405 | 74/405 |
| 2014/0284421 A1* | 9/2014 | Osman | B64C 25/405 | 244/50 |
| 2015/0314862 A1* | 11/2015 | Blanc | B64C 25/405 | 244/103 S |
| 2017/0113788 A1* | 4/2017 | Essinger | B64C 25/405 | |

FOREIGN PATENT DOCUMENTS

| | | | | |
|---|---|---|---|---|
| WO | WO 2011134503 A1 * | 11/2011 | | B64C 25/405 |
| WO | 2012/098198 A2 | 7/2012 | | |
| WO | WO 2013123993 A1 * | 8/2013 | | B64C 25/405 |

OTHER PUBLICATIONS

PPRuNe.org, "Nose Wheel Brakes", 2003; http://www.pprune.org/tech-log/95014-nose-wheel-brakes.html; accessed Sep. 13, 2017.*
French Preliminary Search Report of FR1459503 dated Jun. 1, 2015.

* cited by examiner

AIRCRAFT UNDERCARRIAGE WITH WHEEL BRAKE AND DRIVE ASSEMBLY HAVING A COUPLER MEMBER

The invention relates to the field of systems for driving aircraft wheels in rotation on the ground.

BACKGROUND OF THE INVENTION

In order to reduce fuel consumption, carbon emissions, and sound nuisance, aircraft manufacturers are attempting to develop electrical systems for driving rotation of aircraft wheels and to incorporate such systems in existing aircraft. The electrical drive systems that have been investigated conventionally comprise an electric motor associated with at least one wheel of an undercarriage and coupler means for selectively coupling and decoupling an outlet shaft of the motor with the rim of the associated wheel. The shaft and the wheel are coupled during stages of taxiing, and they are uncoupled during stages of takeoff, landing, and while the aircraft is in flight.

The design of such a drive system needs to satisfy numerous constraints and to overcome multiple major technical difficulties, some of which are briefly outlined below.

The increase in weight that results from installing the drive system must be as small as possible so that the increase in weight does not outweigh the benefits obtained in terms of reducing the use of fuel.

In order to limit the weight of the drive system, it is desired in particular to simplify the coupler means as much as possible. Drive system architectures in which the coupler means comprise tangential rods actuated by phase shifting two rings via a complex mechanism have been investigated and then discarded.

It is also desired to limit as much as possible the number of drive system parts that are permanently associated with the rim of the wheel, and also to limit their weight, since those parts are subjected to the same mechanical stresses as the wheel (speed, acceleration, shocks, vibration). The use of such parts presents a major impact in evaluating the operating safety of the undercarriage and of the aircraft.

It is naturally also desired to limit as much as possible the mechanical stresses to which the undercarriage is subjected by the parts of the drive system, in order to avoid shortening the lifetime of those parts.

Attempts have also been made to devise a drive system that is compact, since the space available on an undercarriage between the leg of the undercarriage and the wheel is small, in particular because of the presence of the actuator carrier for the wheel brake when the wheel is a braked wheel.

It is also appropriate to develop a drive system suitable for being installed on an already-existing undercarriage without such installation requiring the undercarriage to be modified structurally, and without such installation requiring major modifications to be made to existing wheels and brakes. Such modifications are particularly penalizing for aircraft manufacturers since they involve new development and then performing new certification activities for the undercarriage, the wheels, and the brakes. The costs associated with such new activities can greatly diminish the attractiveness to airlines of such drive systems.

OBJECT OF THE INVENTION

An object of the invention is to provide an electrical system for driving rotation of an aircraft wheel, which system is of small weight and size, has a limited number of parts that are permanently associated with the rim of the wheel, is installed on the undercarriage so as to be subjected as little as possible to mechanical stresses, and is relatively simple to incorporate on an existing undercarriage.

SUMMARY OF THE INVENTION

In order to achieve this object, the invention provides an aircraft undercarriage comprising at least:
- a wheel mounted on an axle to rotate about an axis of rotation X;
- a brake comprising a torsion tube extending around the axle, friction members mounted around the torsion tube and extending between the torsion tube and the wheel, and at least one brake actuator for selectively exerting a braking force on the friction members; and
- drive means for driving rotation of the wheel, the drive means comprising an electric motor connected to the rim of the wheel by a coupler member.

According to the invention, the coupler member extends at least in part around the axle between the axle and the torsion tube of the brake.

Because it is incorporated around the axle, which is relatively small in diameter, the coupler member presents size and weight that are considerably reduced, e.g. compared to a coupler member used for implementing a solution involving meshing with a circumference of a side face of a rim of the wheel.

The only parts that are permanently connected to the rim of the wheel are parts that enable the coupler member to be constrained to rotate with a portion of the rim that extends facing the axle. These parts present small weight and are limited in number as a result, once again, of the position of the coupler member.

Since the coupler member extends at least in part between the axle and the torsion tube of the brake, it is subjected to the effects of deflections of a rim of the wheel and of the axle (ovalizing under load, deforming when turning, etc.) that are relatively small, e.g. compared to the effects of deflections at a circumference of a side face of the rim.

Finally, incorporating the coupler member does not require any major modification to the undercarriage, to the wheel, or to the brake, since the coupler member is located in a space that is available between the axle and the torsion tube. It should be observed that because of this position, the coupler member has little impact on the air stream generated by a device for cooling the brake and thus on the time required for cooling the friction members of the brake, and that once more makes it easier to incorporate the coupler member on the undercarriage.

BRIEF DESCRIPTION OF THE DRAWINGS

The invention can be better understood in the light of the following description given with reference to the figures of the accompanying drawings, in which.

DETAILED DESCRIPTION OF THE INVENTION

Figure 1:
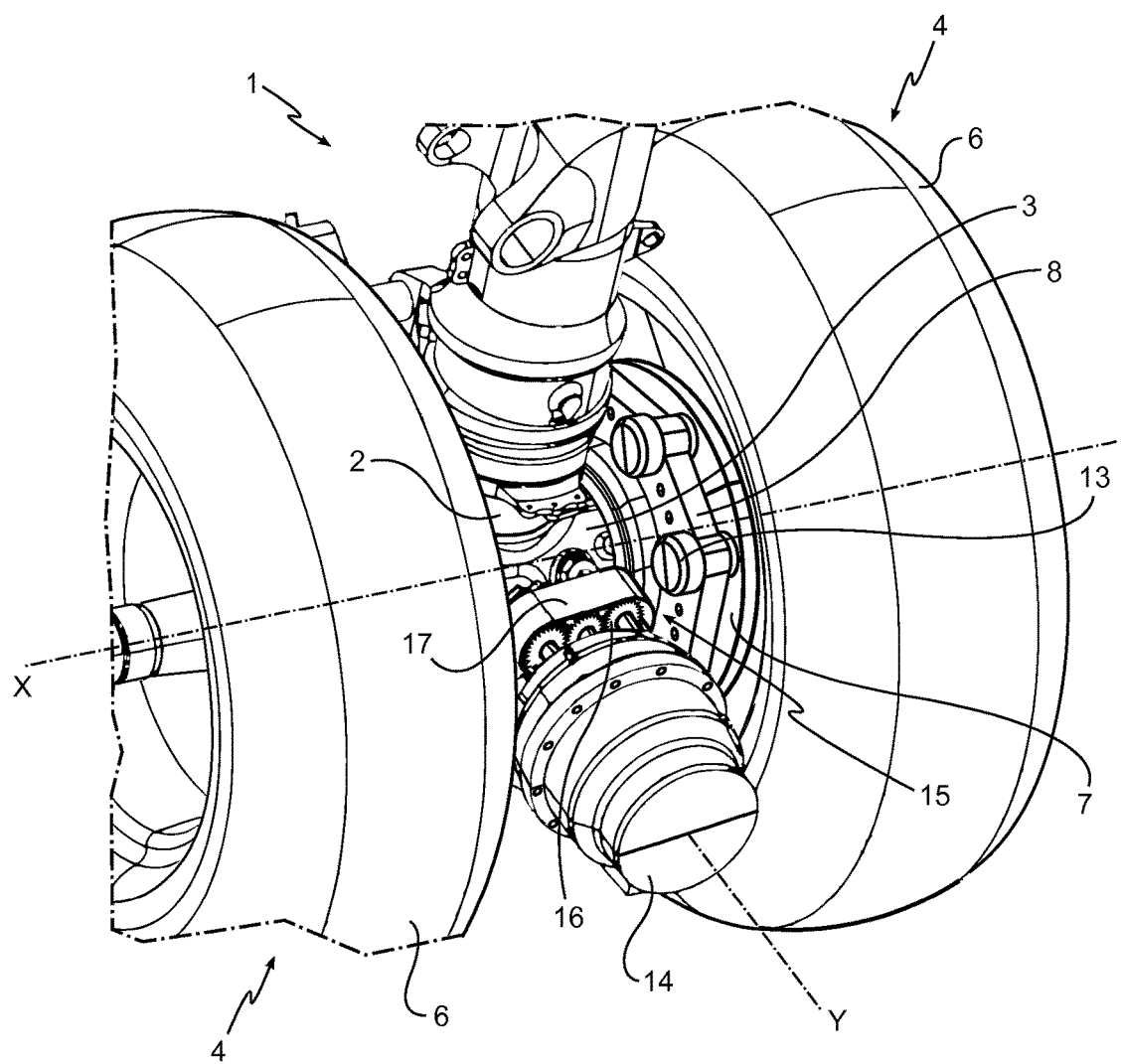
FIG. 1 is a perspective view of an undercarriage of the invention.
Figure 2:
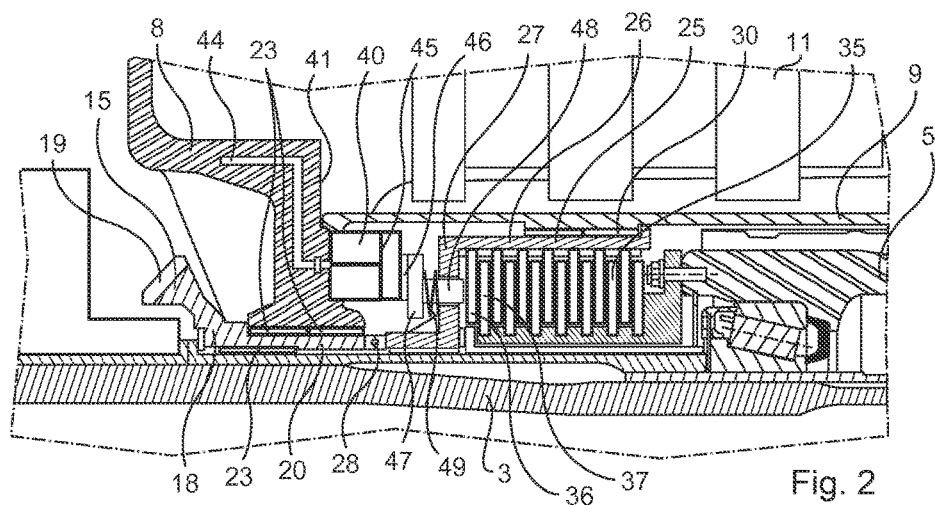
FIG. 2 is a section view of a top portion of a coupler member that extends between an axle and a torsion tube of a brake of the undercarriage of the invention, in a first embodiment.

With reference to FIGS. 1 and 2, the undercarriage 1 of the invention in a first embodiment comprises in conventional manner a strut hinged to the structure of an aircraft and having a sliding rod 2 mounted to slide telescopically therein. The sliding rod 2, shown in its fully retracted position, carries at its end an axle 3 on which two wheels 4 are mounted.

Each wheel 4 has a rim 5 carrying a tire 6 and mounted to rotate on the axle 3 via bearings on an axis X. Each wheel 4 is also fitted with a brake 7 adapted to brake the wheel 4.

The brake 7 includes a support comprising an actuator carrier 8 and a torsion tube 9 extending around the axle 3. The brake 7 also has friction members 11 mounted around the torsion tube 9 and extending between the torsion tube 9 and the wheel 4, specifically a stack of carbon disks 11. The brake 7 also includes at least one braking actuator 13, specifically a plurality of braking actuators 13 for selectively exerting a braking force on the stack of disks 11 in order to slow rotation of the wheel 4 and brake the aircraft.

The undercarriage 1 is also fitted with means for driving the two wheels 4 in rotation for the purpose of driving rotation of the two wheels 4 when the aircraft is on the ground.

On the undercarriage 1, the rotary drive means comprise a single electric motor 14 associated with both wheels 4, and two coupler members 15 each enabling an outlet shaft from the electric motor to be connected to the rim 5 of a respective wheel 4.

The electric motor 14 is located at the bottom of the undercarriage 1 level with a central portion of the axle 3. The outlet shaft from the electric motor 14 rotates about an axis Y that is orthogonal to the axis X.

The coupler member 15 for each wheel 4 includes gearing 16 forming a first reduction stage and a second reduction stage, said gearing 16 being made up of gearwheels located inside a single gearbox 17 located at the bottom of the undercarriage 1 close to the electric motor 14. The gears turn about respective axes that are also orthogonal to the axis X.

The coupler member 15 also includes a drive shaft 18 having a toothed portion 19 and a tubular portion 20 that extends at least in part, and in this example in full, around the axle 3 between the axle 3 and the actuator carrier 8. The toothed portion 19 constitutes a portion of 90° angle take-off gearing, said angle take-off gearing forming a third reduction stage.

The first reduction stage, the second reduction stage, and the third reduction stage are for modifying the drive torque produced by the electric motor 14 so as to generate driving torque adapted to drive each wheel 4 in rotation and to transmit this driving torque perpendicularly to the axis Y of the outlet shaft of the electric motor 14.

The tubular portion 20 of the drive shaft 18 is separated both from the axle 3 and from the actuator carrier 8 by means of bearings 23 allowing the drive shaft 18 to rotate relative to the axle 3 and relative to the actuator carrier 8.

The coupler member 15 also has a drive body 25 with a cylindrical portion 26 that extends around the axle 3 and a base 27 that is perpendicular to the axle 3. The drive body 25 is constrained to rotate with the drive shaft 18 by a passive dog clutch 28 that makes the coupler member 15 easier to disassemble.

The cylindrical portion 26 of the drive body 25 is separated from the torsion tube 9 by bearings 30 allowing the cylindrical portion 26 to rotate relative to the torsion tube 9.

The driving torque is transmitted via the coupler member 15, which extends between the axle 3 and the actuator carrier 8 and then between the axle 3 and the torsion tube 9. The coupler member 15 is thus subjected to the effects of the rim 5 deflecting (ovalizing under load, deforming while turning, etc.), and to the effects of the axle 3 deflecting, that are relatively small, e.g. compared to the effects of deflections at the circumference of a side face of the rim 5.

It should be observed at this point that contrary to a solution involving meshing with the circumference of the side face of the rim 5, lubricating the gearing 16 making up the first reduction stage, the second reduction stage, and the third reduction stage is made easier by the small diameter of this gearing 16. This small diameter also makes it possible to position the first and second reduction stages in the gearbox 17, thereby protecting these reduction stages from physical and chemical attacks associated with the environment of the undercarriage 1.

Finally, the coupler member 15 includes a clutch member 35 for selectively engaging the cylindrical portion 26 of the drive body 25 with the rim 5 of the wheel 4, and thus engaging the outlet shaft of the electric motor 14 with the rim 5 of the wheel 4.

The clutch member 35 has clutch disks comprising a plurality of first clutch disks 36 constrained to rotate with the drive body 25 of the coupler member 15 and a plurality of second clutch disks 37 constrained to rotate with the rim 5 of the wheel 4. The first clutch disks 36 and the second clutch disks 37 thus form a dry multidisk clutch.

The clutch member 35 is actuated by a clutch actuator 40 carried by the actuator carrier 8 of the brake 7. The clutch actuator 40 is mounted on an inside face 41 of the actuator carrier 8. The term "inside face" is used herein to mean a face of the actuator carrier 8 facing the stack of carbon disks 11 and the torsion tube 9. The clutch actuator 40 is positioned on this inside face 41 between the torsion tube 9 and the axle 3.

The clutch actuator 40 is a hydraulic actuator powered by a feed duct 44 that runs in part over the actuator carrier 8.

The hydraulic actuator 40 includes a piston 45 co-operating with a thrust bearing 46 (in this example a needle thrust bearing) positioned on a press interface 47 including a pusher 48 that extends through the base 27 of the drive body 25.

When it is appropriate to connect the cylindrical portion 26 of the drive body 25 to the rim 5 of the wheel 4, the hydraulic actuator 40 is powered and the piston 45 pushes the thrust bearing 46 against the press interface 47. The pusher 48 of the pressure interface 47 then exerts an axial force on one of the first clutch disks 36. By friction, this force constrains the first clutch disks 36 to rotate with the second clutch disks 37 and thus constrains the drive body 25 to rotate with the rim 5 of the wheel 4. The driving torque derived from the drive torque of the motor is thus transmitted to the wheel 4, which is driven in rotation.

When it is appropriate to separate the cylindrical portion 26 of the drive body 25 from the rim 5 of the wheel 4, the hydraulic actuator 40 is no longer powered. A return spring 49, located in this example between the press interface 47 and the base 27 of the drive body 25, then returns the press interface 47 and the piston 45 to a retracted position in which no axial force is exerted on the first clutch disk 36.

It should be observed that the cylindrical portion 26 of the drive body 25 and the rim 5 of the wheel 4 are separated by default (fail-safe type technology): if the clutch actuator 40 is not powered, separation takes place automatically. In the absence of a force being applied axially against the first clutch disks 36 and the second clutch disks 37, accidental connection of the drive body 25 with the rim 5 of the wheel 4 is not possible, even when the rim 5 and the axle 3 are deformed.

Thus, in the event of a malfunction affecting the electric motor 14, the coupler member 15, or the clutch actuator 40, rotary drive is no longer available for the wheel 4, but rotation of the wheel 4 is not prevented by an accidentally exerted friction force.

The pair of materials used for making the first clutch disks 36 and the second clutch disks 37 enables the first and second clutch disks 36 and 37 to be given a high coefficient of friction. The pair of materials is preferably a carbon/steel pair or a carbon/carbon pair or a steel/steel pair. The greater the coefficient of friction, the lower the axial force needed to provide the friction for connecting together the first and second clutch disks 36 and 37 for a given driving torque that is to be transmitted to the wheel 5. In other words, the greater the coefficient of friction and/or the axial force, the greater the driving torque that can be transmitted for a given number of first and second clutch disks 36 and 37.

The use of this multidisk clutch member 35 does not require the speed of rotation of the outlet shaft of the electric motor 14 to be synchronized accurately with the speed of rotation of the wheel 4 prior to being connected together. There is thus no need to measure very accurately the speed of rotation of the wheel 4.

The clutch member 35 is controlled by roughly synchronizing the speed of rotation of the outlet shaft of the electric motor 14 with the speed of rotation of the wheel 4, by engaging the clutch without torque, and then by transmitting the driving torque to the wheel 4. The clutch member 35 is thus subjected to very little slip, thereby limiting wear of the first and second clutch disks 36 and 37, so they can be relatively thin and lightweight. The clutch member 35 heats up little because heating is limited to the synchronization stage.

It should be observed that, unlike a solution involving meshing against the circumference of the side face of the rim, in this example the coupler member 15, the clutch actuator 40, and the clutch member 35 are protected from physical and chemical attack associated with the environment of the undercarriage 1. This protection is provided by the position of these pieces of equipment between the axle 3 and the actuator carrier 8 or the torsion tube 9, and for the first and second reduction stages, because they are incorporated within the gearbox 17.

Figure 3:
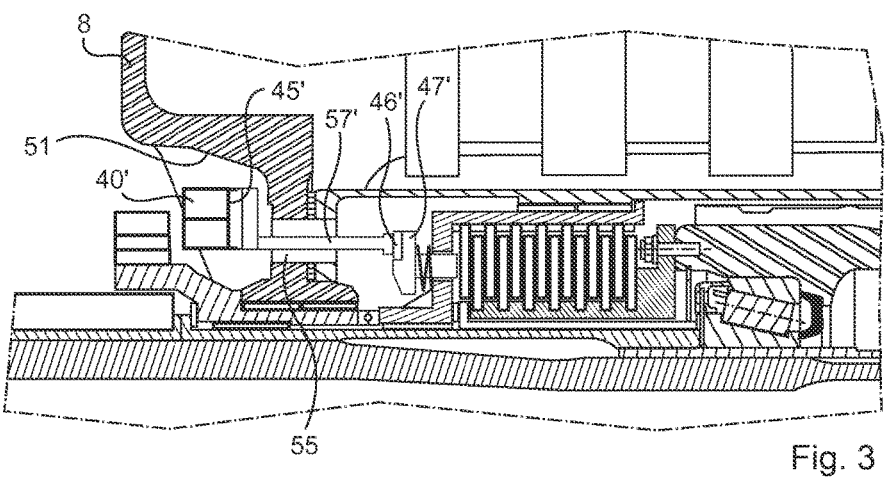
FIG. 3 is a view analogous to FIG. 2 showing a second embodiment of the undercarriage of the invention.
Figure 4:
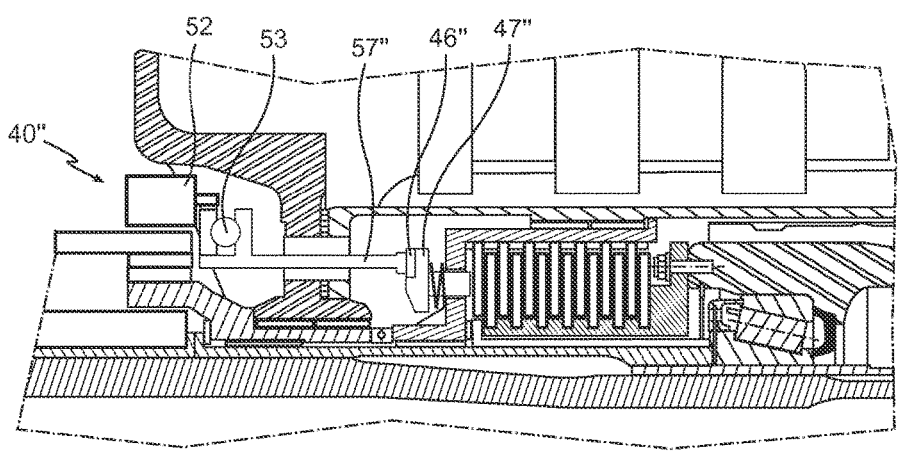
FIG. 4 is a view analogous to FIG. 2 showing a third embodiment of the undercarriage of the invention.

In a second embodiment of the undercarriage of the invention, shown in FIG. 3, the clutch actuator 40' is a hydraulic actuator 40' that instead of being mounted on the inside face 41 of the actuator carrier is mounted on an outside face 51 that faces the leg of the undercarriage. The hydraulic actuator 40' has a piston 45' and a plunger 57' of sufficient length to extend from the outside face 51 of the actuator carrier 8 to the thrust bearing 46' and the press interface 47' through an opening 55 made for this purpose in the actuator carrier 8.

In a third embodiment of the undercarriage of the invention, the clutch actuator 40" is positioned in the same way as in the second embodiment, but in this embodiment it is an electromechanical actuator 40" comprising an electric motor 52 and a ball ramp mechanism 53. The ball ramp mechanism 53 imparts axial movement to the plunger 57" so that the clutch actuator 40" pushes the plunger 57" against the press interface 47" via the thrust bearing 46".

The invention is not limited to the particular embodiments described above, but on the contrary covers any variant coming within the ambit of the invention as defined by the claims.

Although it is stated that the clutch member comprises a plurality of first clutch disks and a plurality of second clutch disks, it is possible to use a clutch member comprising a single disk constrained to rotate with the coupler member and a single disk constrained to rotate with the rim of the wheel.

The clutch member could perfectly well be a wet multi-disk clutch.

Although it is stated that the third reduction stage comprises 90° angle take-off gearing, it is possible to use some other angle in order to adapt incorporation of the coupler member to some particular arrangement of the drive means on the undercarriage. Any type of angle take-off gearing may be used: bevel gearing, hypoid gearing, face gearing, etc.

The invention claimed is:

1. An aircraft undercarriage comprising at least:
a wheel (4) mounted on an axle (3) to rotate about an axis of rotation (X);
a brake (7) comprising a torsion tube (9) extending around the axle (3), friction members (11) mounted around the torsion tube (9) and extending between the torsion tube (9) and the wheel (4), and at least one brake actuator (13) for selectively exerting a braking force on the friction members; and
drive means for driving rotation of the wheel, the drive means comprising an electric motor (14) connected to a rim (5) of the wheel (4) by a coupler member (15);
the undercarriage being characterized in that the coupler member (15) extends at least in part around the axle (3) between the axle and the torsion tube (9) of the brake.

2. The aircraft undercarriage according to claim 1, wherein the coupler member (15) comprises a clutch member (35) for selectively connecting together the electric motor and the rim of the wheel, the clutch member facing the torsion tube.

3. The aircraft undercarriage according to claim 2, wherein the clutch member includes clutch disks comprising at least one first clutch disk (36) constrained to rotate with the coupler member and at least one second clutch disk (37) constrained to rotate with the rim of the wheel.

4. The aircraft undercarriage according to claim 2, wherein the brake includes an actuator carrier (8) carrying the brake actuator (13), and wherein the clutch member is actuated by a clutch actuator (40; 40'; 40") carried by the brake actuator.

5. The aircraft undercarriage according to claim 4, wherein the clutch actuator is mounted on an inside face (41) of the actuator carrier (8) and extends between the axle and the torsion tube of the brake.

6. The aircraft undercarriage according to claim 4, wherein the clutch actuator is mounted on an outside face (51) of the actuator carrier.

7. The aircraft undercarriage according to claim 4, wherein the coupler member (15) includes a drive shaft (18) having a toothed portion (19) and a tubular portion (20) extending at least in part around the axle between the axle and the actuator carrier.

8. The aircraft undercarriage according to claim 7, wherein the toothed portion (19) forms part of angle take-off gearing.

9. The aircraft undercarriage according to claim 1, wherein an outlet shaft of the electric motor (14) and the axis of rotation (X) of the wheel (4) are mutually orthogonal.

\* \* \* \* \*